April 8, 1952  P. A. PERILHOU  2,592,459
RADIO SYSTEM FOR DISTANCE MEASUREMENT
Filed Sept. 24, 1948
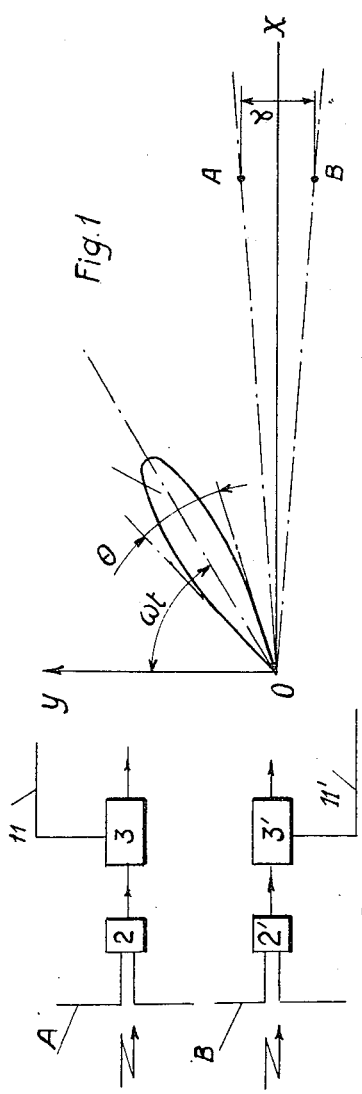
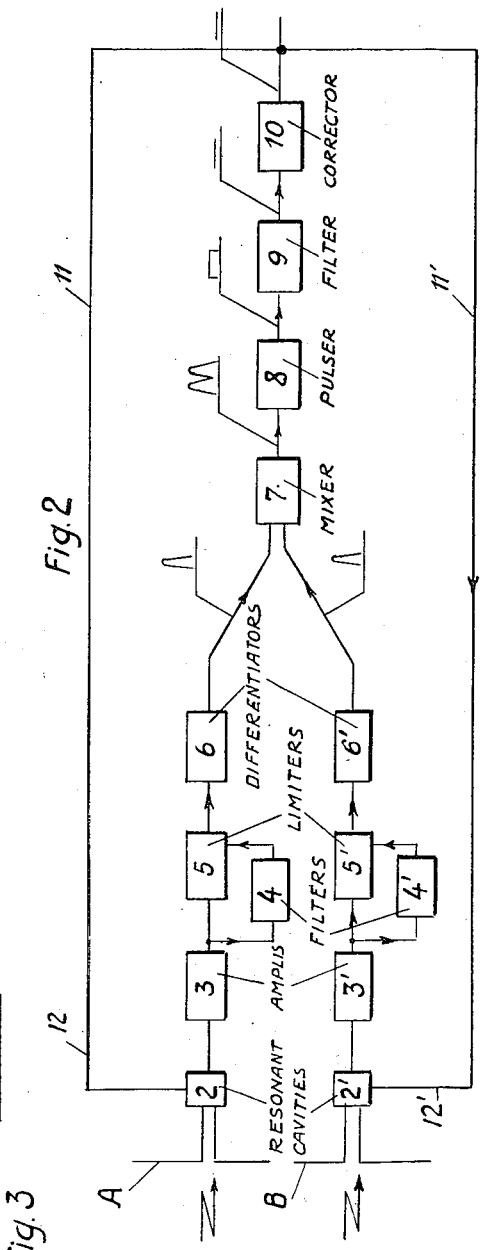
Inventor:
Pierre André Perilhou
by Brown + Deward
Attorneys

UNITED STATES PATENT OFFICE 2,592,459

RADIO SYSTEM FOR DISTANCE MEASUREMENT

Pierre André Perilhou, Clamart, France, assignor to Office National d'Etudes et de Recherches Aeronautiques, Paris, France, a company of France Application September 24, 1948, Serial No. 51,030
In France September 25, 1947

8 Claims. (Cl. 343—106)

This invention relates to the problem of controlling the reception of radio electric apparatus and has for its object a method and means permitting to maintain the level of a reception between predetermined limits in spite of variations of an incoming field in certain conditions of use.

The invention is applicable more particularly to the field of ultra short waves and namely to receiver apparatus used in relation with radio beacons of a rotating beam type or the like with a view to render the output voltage of such receiver apparatus independent of variations of distance between such an apparatus and the radio beacon.

In an application of a radio beacon of such a type to the guiding of dirigible craft, it has been suggested to use the time interval between the instants of reception of a beam of radiant energy angularly movable in azimuth by two separate receiving aerials spaced apart a certain distance, for determining the range between the base of reception constituted by these two aerials and the radio beacon.

As the field intensity of transmitted radiations varies with distance of the receiving point to the transmitter, a measure of distance may serve for controlling the reception so as to maintain the level of the same substantially independent of distance.

Accordingly, the invention broadly consists in a novel method of automatic volume control of a receiver apparatus according to which the level of reception of such an apparatus is controlled in accordance with a measure of distance between said apparatus and the transmitter of incoming radiations.

More particularly the invention contemplates the application of the above principle to receiver equipments incorporating or used in conjunction with distance measuring arrangements, and especially those of the very high frequency type.

As a particular case of such applications, the invention contemplates furthermore a receiver equipment of the above mentioned type comprising at least two spaced and independent receiving aerials intended for operation in conjunction with a radio beacon of the type producing a beam of radiant energy and namely of a very high frequency presenting a variable characteristic in azimuth, in order to provide an indication of distance of a craft with respect to said beacon and/or guide the same toward said beacon.

According to a further feature of the invention, the level of reception of such an apparatus is controlled as function of a time difference between instants of reception of a said beam of radiant energy by two aerials spaced apart a predeterminate known distance.

In accordance with an other feature of the invention, the automatic volume control is perfected by biasing an amplifier and namely the first tube of a receiver channel by a voltage which varies as a function of a measure of distance and in the particular case of the above mentioned apparatus, by a time lag between the instants of reception of incoming radiations by two spaced receiving aerials.

According to another feature of the invention, the above mentioned control of reception may be produced by detuning or varying the coefficient of over-voltage of a resonant volume of a receiver channel as a function of a voltage proportional to a measure of distance or again in the case of the above mentioned equipment by the time lag between pulses induced by a rotating or like beam of radiant energy upon its passage by two spaced aerials, this voltage giving the measure of distance.

The above and other objects and features of the invention will appear clearly from the folowing description and the annexed drawings, it being understood that these drawings are given for the purpose of illustration of the invention only and are not limitative with regards to the scope of the invention.

On the drawings:

Fig. 1 shows a schematic representation of the use of a radio beacon of a rotating beam type in conjunction with a receiving assembly comprising two spaced aerials permitting to measure the distance separating the point of origin of the radio beam and the point at which is located said base of reception.

Fig. 2 shows a block diagram of an apparatus or equipment constituting an embodiment of the invention.

Fig. 3 represents a portion of a block diagram similar to that of Fig. 2 and illustrates a different embodiment of the invention.

Referring now to Fig. 1 there is shown in 1 a directive beam of ultra high frequency radiations produced by a rotating radio beacon (not shown) located at point O. This beam is characterized by a beam width $\theta$ and is rotated in azimuth at a uniform speed $\omega$ about the point of origin O. At point M, on axis OX, there is shown a receiving equipment comprising two aerials A and B arranged symmetrically on either sides of axis OM at the opposite extremities of a base line perpendicular to said axis, said equipment permitting to measure the distance between points M and O. This receiving equipment may be carried by a dirigible craft and in such a case may serve for measuring the distance of said craft to the radio beacon 1. This measure of distance is based on the measure of the time spacing between the instants of reception of the rotating beam by the two aerials, said time spacing being expressed by a variable voltage depending on said distance, in accordance with a disclosure of a copending application Serial No. 50,515, filed on September 22, 1948.

One of the aerials of the receiving assembly AB may be used also for determining the azimuth of the dirigible craft carrying the same with respect to said radio beacon, for instance in accordance with the disclosure of another pending application Serial No. 48,487, filed on September 9, 1948.

In the above mentioned and similar applications of radio beacons and more particularly of a rotating beam type, it is always interesting to obtain the desired indications at the greatest possible range so that the over voltage coefficient of resonant volumes used in such receivers must have the maximum value. However, with a decrease of the distance between a craft and a radio beacon or in general a transmitter, the voltage applied to resonant volume devices becomes rapidly excessive for a proper operation of cristals of said devices and consequently this creates a necessity to reduce such a voltage as the craft approaches to the radio beacon or a transmitter.

As on the other hand the use of known arrangements of automatic volume control based on a measure of the reception level presents certain difficulties and drawbacks as regards interference and setting in of oscillations, it is suggested, according to the invention, to effect an automatic volume control in a receiver and more particularly of the type specified, in response to a measure of the distance between the craft and the transmitter of incoming radiations.

This invention is especially applicable to apparatus or equipments including distance measuring provisions or devices such as more particularly described in copending applications Serial No. 50,515, filed on September 22, 1948, entitled "Improvements in Distance Measuring Systems," and Serial No. 50,514, filed on September 22, 1948, entitled "Improvements in Systems for Guiding Dirigible Crafts."

In accordance with said applications, one provides as shown in Fig. 1 at the receiving end for instance on a dirigible craft, two independent aerials A and B spaced apart a predetermined distance. These aerials may be constituted by dipoles associated with resonant volumes 2 and 2' as shown on Fig. 2. The passage of a rotating beam such as 1 on Fig. 1 on two aerials A and B induces in said aerials two signal voltages displaced in time one with respect to the other by a quantity defined by the following equation:

$$\frac{d}{D2\pi\omega}$$

in which:

$d$ is the spacing between two aerials A and B,
$D$ is the distance between the point of location of the radio beacon and the point of location such as M of aerials A and B and
$\omega$ is the angular speed of rotation of the beam.

This time interval may be expressed in terms of a voltage proportional to said interval as it has been suggested in one of the above mentioned copending application Serial No. 50,515, filed on September 22, 1948, and entitled "Improvements in Distance Measuring Systems" and which is used for providing an indication of distance D.

According to the present invention, it is suggested to use such or a similar indication of measure of distance for effecting an automatic volume control of a receiver equipment and more particularly of an equipment providing such a measure of distance separately or in conjunction with other indication permitting to determine the azimuth of a craft or to guide the same toward a radio beacon.

Fig. 2 shows an example of such an equipment and illustrates the principle of application of the present invention to said equipment, it being understood that the invention is not specifically limited to this particular embodiment.

Referring now to Fig. 2, there is shown two aerials A and B forming a distance measuring base line carried by a craft and cooperating with a radio beacon of a rotating beam type such as shown in 1 on Fig. 1. As shown, these aerials are followed by receiving channels each comprising an amplifier 3—3', a filter 4—4', a limiter 5—5' and a differentiator 6—6'. The outputs of said channels are connected to the input of a mixer 7 followed by pulser 8, a second filter 9 and a corrector 10, this latter feeding an indication apparatus not shown. The operation of this equipment corresponds to that described in the copending application Serial No. 50,515, filed on September 22, 1948, and entitled "Improvements in Distance Measuring Systems" and needs not to be described in detail here. It will be sufficient to state that signals induced in the aerials A and B after an amplification are indexed in relation to time by locally produced short duration pulses corresponding to a certain point of each signal curve determined by a certain signal level having a predetermined relation to the maximum level of said signals. These locally produced pulses are introduced into the mixer and are used to produce a voltage proportional to their spacing in time which constitutes the measure of distance of this equipment to the radio beacon.

According to the invention, to provide an automatic volume control of such an equipment, it is suggested to use the distance indicating voltage at the output of corrector 10 to control an element of the receiving channels corresponding to the two aerials, represented by the lines 11 and 11'.

This voltage may be adapted to act directly on the bias of a first amplifier tube 3—3' in each channel, as shown in Fig. 3, or on a resonant cavity such as 2—2' of said channels, as shown in Fig. 2, so as to detune the same when the receiving base line AB is approaching the point O, that is when the interval of time between the received signals and consequently the mean voltage at the output of corrector 10 increases.

This method permits thus to protect detector crystals of resonant volumes against excessive voltages, while avoiding any risk of interference or setting in of oscillations by eliminating the use of a closed circuit control presently used in known system for producing such a control.

Although the invention has been described in its application to a particular receiving equipment, it is understood that the same may be applied to many other equipments and more particularly to those incorporating or used in conjunction with distance measuring arrangements,

I claim:
1. In a system for distance measurement comprising means for transmitting from one point a beam of radiant energy adapted to rotate in azimuth, means for receiving said beam at another point, said latter means comprising at least two independent aerials spaced transversely and symmetrically with respect to a straight line joining the two points, means for combining the effects of reception of said beam by said aerials so as to provide an indication of distance by a value of a current voltage depending on the time spacing of equivalent phases of said effects of reception and means for controlling the level of reception of said energy receiving means in response to the value of said current or voltage to maintain said level substantially independent of distance.

2. In a system for distance measurement comprising means for transmitting from one point a beam of radiant energy adapted to rotate in azimuth, means for receiving said beam at another point, said latter means comprising at least two independent aerials spaced transversely and symmetrically with respect to a straight line joining the two points, means for comparing in relation to time the equivalent phases of reception of said rotating beam by said aerials so as to provide an indication of distance as a function of time spacing of said phases of reception, means for producing in response to the time comparison of the equivalent phases of reception of said rotating beam by said aerials to provide a current or voltage giving a measure of distance between the two points and means for controlling the level of reception of said energy receiving means in response to said current or voltage.

3. In a system for distance measurement comprising means for transmitting from one point a beam of radiant energy adapted to rotate in azimuth, means for receiving said beam at another point, said latter means comprising at least two independent aerials spaced transversely and symmetrically with respect to a straight line joining the two points, means for indexing in relation to time signal curves of reception of said beam by said aerials by locally produced sharply defined pulses corresponding to a point on said curves determined by a certain level of said signals having a predetermined relation to the maximum level thereof, means for combining said locally produced pulses so as to provide an indication or measure of distance by a value of a current or voltage depending on the time spacing of said pulses and means for controlling the level of reception of said energy receiving means in accordance with said current or voltage.

4. In a system for distance measurement comprising means for transmitting from one point a beam of radiant energy adapted to rotate in azimuth, means for receiving said beam at another point, said latter means comprising at least two independent aerials spaced transversely and symmetrically with respect to a straight line joining the two points, means for indexing in relation to time signal curves of reception of said beam by said aerials by locally produced sharply defined pulses corresponding to a point on said curves determined by a certain level of said signals having a predetermined relation to the maximum level thereof, means for comparing in relation to time said locally produced pulses so as to provide an indication of distance by the time spacing of said pulses, means for producing a current or voltage proportional to the time spacing of said pulses and means for controlling the level of reception of said energy receiving means in response to said current or voltage.

5. In a system for guiding a dirigible craft toward a given point, a distance measuring equipment comprising means for transmitting from said point wave energy radiations presenting a characteristic variable in azimuth, and means for receiving said radiations on the dirigible craft, said latter means comprising at least two independent aerials spaced transversely to said craft, means for combining the effects of reception of said aerials to produce an indication of distance of the craft to said point and means for using said measure of distance to control the level of reception of said receiving means to compensate for the variation thereof in accordance with variation of said distance.

6. A receiver apparatus for a dirigible craft permitting to measure distance of said craft to a given point comprising at least two independent aerials spaced transversely to said craft and adapted to cooperate with a beacon located at said point and transmitting wave energy radiations presenting a characteristic variable in azimuth, separate receiver channels associated with each of said aerials, common receiver means connected to said channels for combining the effects of reception of said aerials to produce a voltage giving a measure of distance of the craft to said point and means for controlling said separate receiver channels corresponding to said aerials by said voltage so as to render the effects of reception of said aerials independent of said distance.

7. A receiver apparatus according to claim 6 wherein the spaced aerials are adapted to cooperate with the wave energy transmitting beacon to produce a measure of distance and an indication of directional guidance of the craft toward said beacon and in which said measure of distance is applied to control said receiver means to maintain the level of reception independent of distance.

8. A receiver apparatus permitting to measure distance of a dirigible craft to a given point comprising at least two independent aerials spaced transversely to said craft and adapted to cooperate with a beacon located at said point and producing a beam of radiant energy rotating in azimuth about said point, receiver means associated with said aerials for determining the time spacing between signals induced by said beam in said aerials upon its passage by said aerials, means for translating said time spacing into a voltage or current of a corresponding value representing the measure of distance of the craft to the point of location of said beacon and means for applying said voltage to control said receiver means to maintain the level of reception independent of distance.

PIERRE ANDRÉ PERILHOU.

REFERENCES CITED

The following references are of record in the file of this patent:

UNITED STATES PATENTS

| Number | Name | Date |
| --- | --- | --- |
| 1,999,047 | Hahnemann | Apr. 23, 1935 |
| 2,034,520 | Leib | Mar. 17, 1936 |
| 2,051,966 | Runge | Aug. 25, 1936 |
| 2,307,023 | Cooke et al. | Jan. 5, 1943 |
| 2,439,044 | Ferrill | Apr. 6, 1948 |